United States Patent Office 3,013,077
Patented Dec. 12, 1961

3,013,077
PROCESS FOR THE PREPARATION OF KETONES
Julius Jacob Fuchs, Charleston, W. Va., assignor to E. I. du Pont de Nemours and Company, Wilmington, Del., a corporation of Delaware
No Drawing. Filed Jan. 18, 1960, Ser. No. 2,826
3 Claims. (Cl. 260—586)

This invention is concerned with a process for the synthesis of ketones from carboxylic esters having a tertiary hydroperoxy radical attached to the alpha carbon atom. More specifically, this invention is concerned with a process for the synthesis of ketones by the reaction of alkyl ter-1-hydroperoxycarboxylates with aqueous solutions of alkali hydroxides.

The ter-1-hydroperoxycarboxylates employed as starting materials are obtained by the liquid-phase air- or oxygen-oxidation of carboxylic esters having a tertiary hydrogen atom attached to the alpha carbon atom, as described in a copending application, Serial Number 3,141 filed by J. J. Fuchs on January 18, 1960. Such a process can be controlled to give specific oxidation of the alpha tertiary hydrogen atom to yield a 1-hydroperoxycarboxylate which then can be isolated at relatively high concentrations.

An object of the present invention is to provide a novel process for the synthesis of ketones. Another object of this invention is to provide a process for the conversion to ketones of carboxylic esters having a tertiary hydroperoxy radical attached to the alpha carbon of the carboxylic ester. Still another object of this invention is to provide a novel synthesis of cyclohexanone.

It has now been discovered that the objects and advantages of this invention can be achieved by providing a process for the synthesis of ketones which comprises the treatment of tertiary-1-hydroperoxycarboxylic esters, obtained from the air-oxidation of carboxylic esters having a tertiary hydrogen atom attached to the alpha carbon atom, with an aqueous solution of an alkali metal hydroxide at a temperature between about 40° and about 110° C. and recovering the product ketone from the reaction mixture.

The tertiary-1-hydroperoxycarboxylates with which this invention is concerned are esters of aliphatic and naphthenic carboxylic acids which can be represented by the formulae

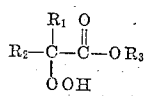

and

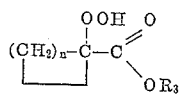

respectively. In the formulae, $R_1$, $R_2$, and $R_3$ represent hydrocarbon radicals such as methyl, ethyl, propyl, butyl, isobutyl, amyl, hexyl, cyclohexyl, etc., and $n$ is an integer from 3 to 5 inclusive. The critical structural feature of these compounds is the tertiary hydroperoxy radical on the carbon atom alpha to the carboxylic ester group. Particularly valuable and useful examples of the naphthenic carboxylic esters are the alkyl 1-hydroperoxy hexahydrobenzoates) sometimes termed 1-hydroperoxycyclohexanecarboxylates) since these can be converted by the process of this invention to cyclohexanone, a valuble solvent in lacquers and the like and also particularly valuable for conversion to adipic acid by nitric acid oxidation. Adipic acid is a particularly valuable monomer for the synthesis of various nylons such as 66-nylon, the product obtained by the condensation polymerization of adipic acid with hexamethylene diamine.

For the successful operation of the initial oxidation process, it is preferable that it be carried out in the absence of metals or other oxidation catalysts since such materials catalyze the decomposition of the hydroperoxide product to give a variety of decomposition products in admixture. Ceramic or glass-lined autoclaves are suitable for the operation of the process at elevated pressures. All glass equipment may be employed if desired for operation of the process at atmospheric pressure.

It has been found that the liquid phase oxidation process can be carried out over a temperature range of from 70° to 200° C., but preferably, the temperature of the reaction should be between 100° and 170° C. At temperatures below 100° C., the oxidation proceeds very slowly so that in general, it is not as economical to carry it out in the temperature range of 70 to 100° C. Above 170° C., the rate of reaction is very rapid, but there is more tendency for the undesirable thermal decomposition of the hydroperoxide product to occur. The process is operable at atmospheric pressure when high boiling carboxylic esters are employed. When lower-boiling materials, such as methyl isobutyrate, are employed, elevated pressures are required to keep the carboxylic ester in the liquid phase. Any pressure sufficient to keep the carboxylic ester selected as starting material in the liquid phase at the oxidation temperature chosen is suitable. In general, the process can be carried out at pressures between atmospheric and about 500 atmospheres pressure.

Either air or pure oxygen can be employed in the oxidation process. Where air is used, provision must be made for passing larger volumes into the oxidizer and for removing the large volume of inert nitrogen from the oxidizer.

Maximum peroxide concentrations in the oxidizer of between 4 and 6% can be obtained. In order to reach such concentrations, the reaction time will vary from about 1½ to 2 hours at 150° C. to 50 hours at 90° C. If the reaction time is extended too far beyond the optimum time, the peroxide concentration decreases from the maximum obtainable.

While the hydroperoxides obtained by the above process may be further processed as a 4–6% solution in the starting material, sometimes it is preferable to concentrate them by distillation under reduced pressure in glass or other non-metallic equipment. By such fractionation, the unreacted starting material is taken overhead as a distillate, and the hydroperoxide product can be concentrated to a solution containing from 30 to 50% hydroperoxide concentration; this solution can be concentrated further by distillation of the hydroperoxide at low pressures and temperatures.

The conversion of the concentrated hydroperoxide solutions to ketones according to the process of this invention is achieved by dissolving the 1-hydroperoxy carboxylic esters in an aqueous solution of an alkali metal hydroxide, such as LiOH, NaOH, or KOH. The presence of about 10% by weight of an alkali metal halide salt is desirable to facilitate the separation of the ketone from the aqueous product solution. About 1 part by weight of the 1-hydroperoxycarboxylate is mixed with from about 10 to about 100 parts by weight of approximately 0.5 to 2 N aqueous alkali hydroxide solution containing 10 parts by weight NaCl or other alkali metal halide salt, and vigorously agitated. Initially the reaction is exothermic, but external heat must be applied to raise the temperature to the boiling point to complete the reaction. On cooling, the reaction mixture separates into two phases, an aqueous phase and an organic phase containing the bulk of the ketone. The ketone can be recovered from the product solution by conventional methods.

As an example, a hydrocarbon solvent can be employed to extract the mixture. Petroleum ether, cyclohexane, benzene, etc., are suitable. Another way to isolate the ketone is to distill it from the reaction mixture together with the alcohol formed and separate the ketone as the solid bisulfite addition product by adding potassium bisulfite. The conversion of the ter-1-hydroperoxycarboxylates is 100% with yields of ketone greater than 95%.

The preparation of cyclohexanone from an alkyl cyclohexane carboxylate (alkyl hexahydrobenzoate) is illustrated by the following equations for methyl cyclohexanecarboxylate:

I.
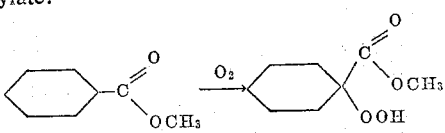

II.
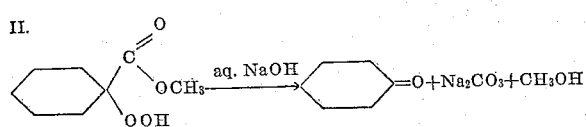

When an aliphatic carboxylic acid ester is employed, an aliphatic ketone results. Thus, for the conversion of methyl isobutyrate to acetone, the reaction is indicated by the following equations:

III.
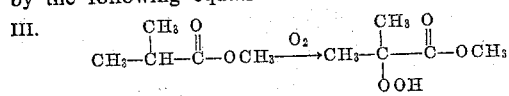

IV.
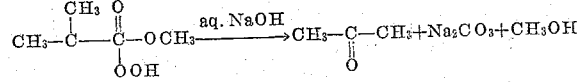

This reaction is particularly useful for preparing unsymmetrical ketones which are otherwise difficult to obtain economically.

The following examples are illustrative of preferred methods of carrying out the process of the subject invention. They are intended to be illustrative only and not limiting on the scope of the invention as disclosed above.

*Example 1*

500 g. of methyl hexahydrobenzoate (methyl cyclohexanecarboxylate) was charged to a 1-liter glass vessel provided with gas inlet and outlet tubes, a reflux condenser, and a high speed agitator. Pure oxygen was bubbled into the reaction mixture, which was maintained at 130° C., at a rate sufficient to give an off-gas volume of 1 cubic foot per hour. Five and nine-tenths percent peroxide concentration was obtained after a total reaction time of nine hours. The hydroperoxide was concentrated by distilling off unreacted starting material at 30° C. under a pressure of 1.0 mm. Hg, using all glass equipment. The tails from this distillation contained between 30 and 50% of the methyl 1-hydroperoxy hexahydrobenzoate product (methyl hydroperoxycyclohexane carboxylate) which was distilled at 43–45° C. at a pressure ranging from 0.5 to 1.0 mm. Hg to yield a distillate containing 64% by weight of the hydroperoxide ester.

*Example 2*

500 g. of n-butyl isobutyrate was charged to a 1-liter glass vessel provided with gas inlet and outlet tube, a reflux condenser, and a high speed agitator. The liquid n-butyl isobutyrate was heated to 140° C. and pure oxygen was bubbled in at a rate sufficient to give an off-gas volume of 1 cubic foot per hour. After four hours' reaction time, the reaction mixture contained 5.2% by weight of the n-butyl 1-hydroperoxyisobutyrate.

*Example 3*

500 g. of methyl isobutyrate was charged to a 1-liter, glass-lined autoclave provided with gas inlet and outlet tubes, a reflux condenser, and a high-speed agitator. Pressure in this equipment was raised to about 10 atmospheres with air and the temperature of the methyl isobutyrate was raised to 150° C. Air was then bubbled through the methyl isobutyrate and nitrogen and unconsumed oxygen were permitted to escape through a downlet valve in the outlet tube. When the concentration of methyl 1-hydroperoxyisobutyrate reached about 4½%, the reaction was stopped and the product solution cooled to room temperature and the pressure reduced to atmospheric. This dilute solution was concentrated by fractional distillation under reduced pressure in all-glass equipment, as in Example 1; the tails from this fractionation contained an approximate 40% concentration of methyl 1-hydroperoxyisobutyrate. Ten parts by weight of this solution of methyl 1-hydroperoxyisobutyrate were added to about 100 parts by weight of 1 normal NaOH solution containing 10 parts by weight NaCl. The mixture gradually warmed up from heat of reaction. A steam bath was applied to heat the reaction to 100° C., and the acetone and methanol were distilled from the reaction mixture as an azeotropic mixture. The product ketone, acetone, was recovered in high yield as its bisulfite addition product.

*Example 4*

5.4 parts by weight of 1-hydroperoxy-1-carbomethoxycyclohexane

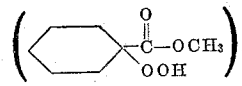

prepared as described in Example 1, of 64.4% purity, was added to about 100 parts by weight of 1 N NaOH containing 10 parts by weight NaCl. A homogeneous solution was obtained on stirring which gradually warmed to 50–60° C. This solution was then heated externally until it started to boil. After cooling, the 2-phase reaction mixture was extracted with cyclohexane, and analysis of the two layers showed that 100% conversion of the hydroperoxide had been obtained to give a yield of cyclohexanone of 97.5%; the yield of sodium carbonate was 99.8%.

This invention provides a process for the production of a wide variety of ketones which are particularly useful as solvents, as thinners in lacquers, for the manufacture of certain explosives, as ingredients in perfumes, and as intermediates in the manufacture of dyes, insecticides, plastics, and pharmaceuticals.

I claim:

1. A process for the synthesis of ketones which comprises reacting an alkyl ester of a tertiary-1-hydoperoxycarboxylic acid, selected from the group consisting of aliphatic and naphthenic tertiary-1-hydroperoxycarboxylic acids, with an alkali metal hydroxide by dissolving said ester in an aqueous solution of an alkali metal hydroxide and heating to a temperature between about 40° and about 110° C.

2. A process according to claim 1 in which the alkyl ester of a tertiary-1-hydroxycarboxylic acid is an alkyl 1-hydroperoxycyclohexanecarboxylate.

3. A process for the synthesis of cyclohexanone which comprises reacting an alkyl tertiary-1-hydroperoxycyclohexanecarboxylate with an approximately 1 normal aqueous sodium hydroxide solution by dissolving the alkyl tertiary-1-hydroperoxycyclohexanecarboxylate in the aqueous sodium hydroxide and heating to the boiling point.

No references cited.